Jan. 14, 1958 W. S. EVERETT 2,819,775
VIBRATION ABSORBER
Filed July 31, 1953
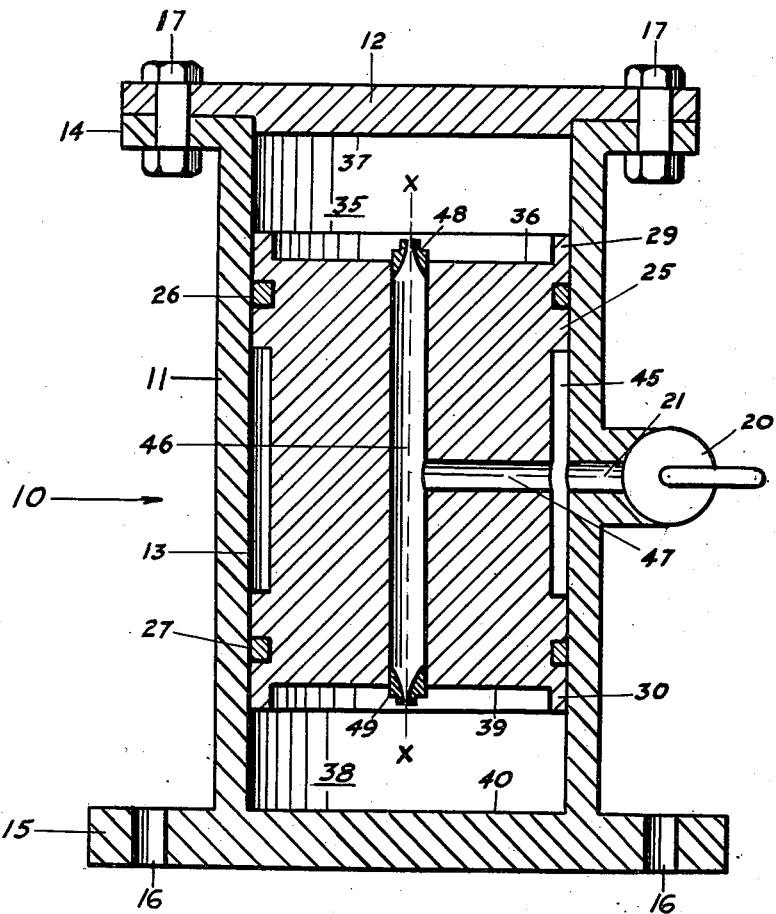
INVENTOR.
WILHELM S. EVERETT
BY
ATTORNEYS

United States Patent Office

2,819,775
Patented Jan. 14, 1958

2,819,775

VIBRATION ABSORBER

Wilhelm S. Everett, Santa Paula, Calif.

Application July 31, 1953, Serial No. 371,737

5 Claims. (Cl. 188—1)

(Granted under Title 35, U. S. Code (1952), sec. 266)

The invention described herein may be manufactured and used by or for the Government of the United States of America for governmental purposes without the payment of any royalties thereon or therefor.

The present invention relates to vibration absorbers and more particularly to vibration absorbers employing an arrangement whereby the resonant frequency thereof may be selectively adjusted.

As is well-known, rotating or reciprocating machinery and the like frequently develop destructive torsional or linear vibrations in various components thereof, and accordingly vibration absorber devices have been developed to absorb such destructive vibrations and prevent injury to the machinery. Prior art vibration absorbers are constructed and designed so as to have a fixed resonant frequency and therefore such devices operate effectively only at a specific vibrational frequency. It is therefore evident that the application of such devices is quite limited and in cases where the vibrational frequency may vary from time to time, it is necessary to provide a separate device to absorb the vibrations at each of the various frequencies which may occur.

The present invention utilizes an arrangement whereby the resonant frequency of the device may be selectively adjusted such that the device is adapted to operate effectively over a wide range of vibrational frequencies. It is evident that devices according to the present invention are adapted for use in numerous applications, and in cases where the vibrational frequency may vary from time to time, it is necessary to provide only one of the invention devices and adjust the resonant frequency thereof in accordance with the various vibrational frequencies it is desired to absorb.

An object of the present invention is the provision of a new and novel vibration absorber which is adapted to operate effectively over a wide range of vibrational frequencies.

Another object is to provide a vibration absorber which is simple and inexpensive in construction, yet is sturdy and reliable in operation.

Other objects and many of the attendant advantages of this invention will be readily appreciated as the same becomes better understood by reference to the following detailed description when considered in connection with the accompanying drawing which illustrates a sectional view of a preferred embodiment of the invention.

In the drawing, a body member is indicated generally by numeral 10 and comprises a main portion 11 and a removable plug member 12, members 11 and 12 being formed of a suitable metal or alloy such as cast iron, bronze or the like.

The outer periphery of member 11 is cylindrical in configuration and a cylindrical cavity 13 is formed therein. A circumferential flange 14 is formed on one end portion of member 11 and a circumferential flange 15 is formed on the opposite end portion thereof, the latter flange having openings 16 extending longitudinally therethrough whereby the body member may be suitably mounted upon a piece of machinery or other device the vibrations of which it is desired to absorb. Member 12 is secured to portion 14 by means of bolts 17, thereby sealing the open end of member 11 such that cavity 13 is completely enclosed and air tight.

A valve 20 is mounted in portion 11 and is adapted to be connected to a source of fluid pressure whereby fluid may be selectively admitted into or vented from cavity 13 through the intermediary of a conduit 21 formed in portion 11.

A substantially cylindrical inertia member 25 formed of cast iron, bronze or the like is snugly fitted within cavity 13 and is adapted to move slidably with respect to the body member. The mass and therefore the longitudinal dimensions and composition of the inertia member depend upon the mass of the device the vibrations of which it is desired to absorb. According to standard design criteria, the mass of the inertia member should be approximately one-tenth that of the vibrating device to obtain satisfactory results. Piston rings 26 and 27 formed of a material similar to that of member 25 are mounted within suitable circumferential grooves provided adjacent the opposite ends of the inertia member whereby fluid is prevented from leaking between the inner wall of portion 11 and the outer wall of the inertia member. Longitudinally extending flanges 29 and 30 are provided on the outer periphery of the opposite end portions of member 25 such that the relative longitudinal movement of the body member and the inertia member is limited.

A first enclosed chamber 35 is formed between the upper surface 36 of member 25 and the lower surface 37 of member 12, and a second enclosed chamber 38 is formed between the lower surface 39 of member 25 and surface 40 of portion 11.

Member 25 has a groove 45 which extends about the outer periphery thereof, and the longitudinal dimensions of the groove are such that the groove is always in communication with conduit 21 regardless of the longitudinal position of the inertia member with respect to the body member. A conduit 46 extends longitudinally through member 25 and thereby provides communication between chambers 35 and 38. A transversely extending conduit 47 is also formed in member 25 and connects conduit 46 with groove 45 whereby valve 20 is adapted to admit into or vent fluid from chambers 35 and 38 at all times.

Fluids which may be employed with the invention device must be compressible fluids such as air, nitrogen, carbon dioxide and the like, and during operation of the device, the fluid is normally disposed within chambers 35, 38, groove 45, and conduits 21, 46 and 47. It is evident that the pressure of the fluid within the device may be adjusted by means of valve 20.

A constriction nozzle 48 is suitably mounted within conduit 46 as by welding or the like adjacent surface 36, and a similar nozzle 49 is mounted in a like manner adjacent surface 39, nozzles 48 and 49 being of conventional design and providing a high resistance to fluid flow in one direction and a relatively low resistance to flow in the opposite direction. In the present device, the nozzles are so mounted in conduit 46 that they offer a high resistance to fluid flow from chambers 35 and 38 into the conduit, but offer a relatively low resistance to fluid flow from the conduit into the chambers. The openings in the nozzle are quite small, e. g. on the order of .002 inch in diameter. In this manner, fluid is easily admitted into the chambers when valve 20 is actuated and the pressure in the two chambers is equalized due to the slow leakage which may occur from chamber to chamber through the nozzles. However, the nozzles prevent rapid flow of fluid from the chambers, and therefore, during operation of the device, as member 25 oscillates back and forth within cavity 13 there will be substantially no flow of fluid from the chambers as the fluid is compressed and expanded by movements of the inertia member 25 with respect to the body member. Flanges 29 and 30 limit the movement of the inertia member with respect to the body member and thereby provide a means which assures that chambers 35 and 38 are not reduced beyond a predetermined minimum volume during operation.

The bodies of fluid disposed within chambers 35 and 38 serve as fluid springs in the present invention, these fluid springs and the inertia member forming a spring-mass system having a resonant frequency which is dependent on the spring constant of the fluid springs. Since the spring constant of the fluid springs is directly proportional to the absolute pressure of the fluid, the spring constant and therefore the resonant frequency of the spring-mass system may be controlled by adjusting the fluid pressure in chambers 35 and 38 by means of valve 20.

The invention device is adapted to absorb either linear or torsional vibrations since it may be mounted such that member 25 moves in a direction in line with or parallel to that of the vibrating mass in the case of linear vibrations, or member 25 may be mounted so that its longitudinal axis X—X is substantially parallel with a tangent to a rotating mass such that member 25 travels circumferentially with the rotating mass. For example, if it is desired to absorb vibrations of a crankshaft, body member 10 may be suitably secured to the shaft in the immediately foregoing manner with its longitudinal axis in a plane which is substantially perpendicular to the longitudinal axis of the crankshaft.

It should be noted that although the arrangement of the grooves and the conduits within member 25 is considered preferable for supplying fluid to chambers 35 and 38, the conduits as shown may be eliminated and conduits may be formed either within the body member or exteriorly thereof, desirably opening into chambers 35 and 38 at the central portions of surfaces 37 and 40 respectively. However, if such an arrangement is utilized, it is still necessary to provide a common connection between the chambers corresponding to conduit 46 and two restriction nozzles corresponding to nozzles 48 and 49 similarly mounted in such common connection. Of course, it is also necessary to provide a means for selectively admitting into or venting fluid from the chambers through the intermediary of the common connection.

When the invention device is suitably mounted on a vibrating machine or the like, it is merely necessary to adjust the fluid pressure within chambers 35 and 38 such that the resonant frequency of the device corresponds with the critical or vibrational frequency to be absorbed. Consequently, when the machine vibrates at this critical frequency, the spring-mass system of the invention device vibrates at its resonant frequency whereby the oscillations of the inertia member with respect to the body member are of a large magnitude and the vibrations of the machine on which the device is mounted are substantially absorbed. In this manner, the invention device may be adjusted to operate most effectively at the critical vibrational frequency of a machine or the like, and the resonant frequency may be adjusted over a wide range of frequencies.

It should be understood that although the body member and inertia member have been shown as cylindrical in configuration, other configurations may be employed if desired. Furthermore, a plurality of the invention devices may be employed in certain applications to provide a greater inertia mass or to absorb both linear and torsional vibrations.

It is apparent from the foregoing that there is provided a new and novel vibration absorber which is adapted to operate effectively over a wide range of vibrational frequencies and which is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:
1. A device for absorbing vibration recurring at a substantially constant frequency which comprises a hollow body means having a longitudinal axis, an inertia means positioned within said body means for reciprocal movement along the longitudinal axis thereof, a pair of chambers respectively disposed between said inertia means and those portions of said body means lying along said longitudinal axis, a compressible fluid within each of said chambers, means constituting a communication channel between said chambers, means associated with said last mentioned means for providing a high resistance to fluid flow from each of said chambers into said channel and a relatively low resistance to fluid flow from said channel into each of said chambers, and means for adjusting the pressure of the fluid within said chambers to bring the resonant frequency of the said vibration absorbing device into substantial coincidence with the recurrence frequency of the vibration to be absorbed.

2. A vibration absorber which comprises a hollow body member having an axis, an inertia member positioned for reciprocal movement along the axis of said body member, a pair of chambers defined by said body member and said inertia member and lying on opposite sides of the latter along said axis, a compressible gaseous fluid within each of said chambers, conduit means providing communication between said chambers through said inertia member, and nozzle means positioned within said conduit means and adapted to provide a high resistance to fluid flow selectively from said chambers to said conduit and a relatively low resistance to fluid flow from said conduit selectively to said chambers, and means for adjusting the pressure of said gaseous fluid in accordance with the recurrence frequency of the vibration to be absorbed.

3. A vibration absorber which comprises a hollow body member of cylindrical configuration, an inertia member within said cylindrical body member and positioned for reciprocal movement along the longitudinal axis thereof, a plurality of chambers disposed between opposite end portions of said inertia member and portions of said body member, a compressible gaseous fluid within each of said chambers, a first conduit extending longitudinally through said inertia member and providing communication between said chambers, a second conduit extending transversely through said inertia member and connected to said first conduit, nozzle means positioned within said first conduit and adapted to provide a high resistance to fluid flow in one direction between said chambers and said first conduit and a relatively low resistance to fluid flow in the opposite direction between said chambers and said first conduit, means for admitting said gaseous fluid from the exterior of said body member to said first conduit through said second conduit, and means for adjusting the pressure of said gaseous fluid in accordance with the recurrence frequency of the vibration to be absorbed.

4. A device for absorbing vibration having a substantially constant recurrence frequency which comprises a hollow body member having an axis, an inertia member within said body member and positioned for reciprocal movement along the axis of the latter, two chambers disposed between the opposite end portions of said inertia member and of said body member, a compressible fluid within each of said chambers whereby as the inertia member moves in one direction with respect to said body member, the fluid in one chamber is compressed and the fluid in the opposite chamber is expanded, a first conduit extending longitudinally through said inertia member and providing communication between said two chambers, a peripheral groove formed at an intermediate portion of said inertia member, a second conduit extending transversely through said inertia member and connecting said first conduit with said groove, means providing communication between said groove and the exterior of said body member whereby the pressure of said fluid may be adjusted, and nozzle means disposed within said first conduit and providing a high resistance to fluid flow from said chambers into said first conduit and a relatively low resistance to fluid flow from said first conduit into said chambers, and means for adjusting the pressure of said fluid in accordance with the recurrence frequency of the vibration to be absorbed by said device.

5. A device for absorbing vibration having a substantially constant recurrence frequency which comprises a body member having a removable end portion and a substantially cylindrical cavity formed therein, a substantially cylindrical inertia member positioned for reciprocal movement within said cylindrical cavity along the longitudinal axis thereof, a first enclosed chamber defined by one end portion of said inertia member and one end portion of said body member, a second enclosed chamber defined by the opposite end portion of said inertia member and the opposite end portion of said body member, a compressible fluid disposed within each of said chambers, a flange formed on the periphery of each end portion of said inertia member for limiting the relative movement between said body member and said inertia member, a first conduit extending longitudinally through said inertia member and providing communication between said first and second chambers, a pair of nozzles respectively positioned at opposite ends of said conduit and providing a high resistance to fluid flow from said chambers into said first conduit and a relatively low resistance to fluid flow from said first conduit to said chambers, a peripheral groove formed at an intermediate portion of said inertia member, a second conduit extending transversely through said inertia member and connecting said first conduit with said groove, means providing communication between said groove and a valve opening to the exterior of said body member whereby the pressure of said fluid may be selectively adjusted, and means for adjusting the pressure of said fluid in accordance with the recurrence frequency of the vibration to be absorbed by said device.

References Cited in the file of this patent

UNITED STATES PATENTS

| | | |
|---|---|---|
| 168,980 | Giffard | Oct. 19, 1875 |
| 1,669,828 | Harley | May 15, 1928 |
| 1,974,171 | Bizzarri | Sept. 18, 1934 |
| 2,015,757 | Moulton | Oct. 1, 1935 |
| 2,633,368 | Ross | Mar. 31, 1953 |
| 2,635,898 | Silverman | Apr. 21, 1953 |

FOREIGN PATENTS

| | | |
|---|---|---|
| 539,720 | Great Britain | Sept. 22, 1941 |